United States Patent [19]

Stol

[11] Patent Number: 4,642,445
[45] Date of Patent: Feb. 10, 1987

[54] SHIELDING APPARATUS FOR METAL PROCESSING OPERATIONS

[75] Inventor: Israel Stol, Pittsburgh, Pa.
[73] Assignee: Westinghouse Electric Corp., Pittsburgh, Pa.
[21] Appl. No.: 750,721
[22] Filed: Jun. 28, 1985
[51] Int. Cl.⁴ .............................................. B23K 26/00
[52] U.S. Cl. ......................... 219/121 FS; 219/121 PP; 219/121 L; 219/121 LG
[58] Field of Search .... 219/121 LM, 121 L, 121 LH, 219/121 PP, 121 LG, 121 LJ, 121 LU, 121 LV, 121 FS, 121 R

[56] References Cited

U.S. PATENT DOCUMENTS

| | | | |
|---|---|---|---|
| 4,078,167 | 3/1978 | Banas et al. | 219/121 FS |
| 4,201,905 | 5/1980 | Clark et al. | 219/121 LG |
| 4,315,133 | 2/1982 | Morgan et al. | 219/121 FS |
| 4,319,120 | 3/1982 | la Rocca | 219/121 L |
| 4,347,785 | 9/1982 | Chase et al. | 219/121 FS |
| 4,417,125 | 11/1983 | Tsutsumi | 219/121 FS |
| 4,473,074 | 9/1984 | Vassiliadis | 219/121 L |

FOREIGN PATENT DOCUMENTS

| | | | |
|---|---|---|---|
| 0068498 | 6/1978 | Japan | 219/121 FS |
| 0102392 | 8/1981 | Japan | 219/121 FS |

*Primary Examiner*—M. H. Paschall
*Attorney, Agent, or Firm*—Thomas R. Trempus

[57] ABSTRACT

The invention provides a generic shield that can be used in welding, surfacing and cladding operations. These operations can be performed with either high power density processes such as lasers and out of vacuum electron means or arc assisted processes and plasma welding and/or cladding systems. The shield physically isolates the shielded region from the surrounding area by providing a zone of inert gas over the work area. As a result, the shield is functionally made to resemble a chamber which moves over the substrate.

20 Claims, 7 Drawing Figures

SHIELDING APPARATUS FOR METAL PROCESSING OPERATIONS

FIELD OF THE INVENTION

This invention relates to a generic shield for use in metal processing. More particularly, this invention is directed to a generic shield which can be used in conjunction with operations utilizing high power density processes such as lasers and out of vacuum electron beams or arc assisted processes such a GMAW, GTAW and plasma welding and/or cladding systems.

BACKGROUND OF THE INVENTION

In most welding, surfacing and cladding operations which are accomplished by the application of heat and the melting of the alloys involved, it is essential to shield the thermally excited regions with specially formulated gases. In the case of arc processes, proper selection of shielding gas which is made on the basis of the ionization potential of the gas, its density, thermal conductivity and chemical reactivity with the molten and solidified alloys, and controlled introduction of this gas about the welding region that is the arc and molten pool, guarantee predictably stable arc behavior, volumetrically sound and dimensionally consistent deposits with proper composition. This in other words minimizes alloy loss through the arc by oxidation. Similarly, many laser assisted welding, surfacing and cladding operations are affected by the gas shielding quality. For example, reactive metals such as titanium are often welded in chambers which are first evacuated or purged with inert gas because they become essentially embrittled by reaction with airborne oxygen and nitrogen.

In certain processes the absence of adequate shielding with inert gas can cause some of the superheated constituents to react with the oxygen in the air to quickly generate a violent reaction which can tend to adversely affect the process. Often this problem is solved by executing the joining process in a closed chamber purged with pure argon. However, the use of a purge chamber becomes impractical in automated processes. This is particularly true when the work cell is of a significant size and purging becomes impractical.

It is therefore an object of this invention to provide a generic shield for joining processes which is particularly well suited and mechanically compatible with an articulated arm of a robot.

It is also an object of this invention to provide a shield which can readily be employed with other arc assisted processes such as welding, surfacing and cladding.

It is yet another object of this invention to provide a generic shield which can be utilized with a laser based process.

It is a further object of this invention to provide a generic shield which is readily adapted for use with either an appropriate torch or the optics necessary for laser based metal processing.

SUMMARY OF THE INVENTION

The invention provides a shielding apparatus for metal processing operations comprising a housing having an enclosed upper region with a central bore therethrough which bore defines a conduit for the application of metal processing thermal excitation onto a selected location of a workpiece. The housing defines at least a first chamber through which inert gas is introduced to flood an area surrounding the selected location; a second chamber disposed about a perimeter defined by said first chamber and defining therein a negative pressure region for the removal of smoke or the like resulting from the metal processing operation. A cooling means including conduit disposed in the first chamber about the central bore provides a fluid path for a cooling fluid. A plasma suppression nozzle is disposed proximate the central bore to provide a high velocity off axis jet of inert gas to forcibly blow away superheated vapors and gas from the selected location. Preferably, the first housing is divided into quadrants and each quadrant is provided with a controlled inert gas stream source. Each quadrant further includes a first stage gas diffuser and a stack of filter screens which provides laminar-like flow pattern to the work area. Additionally, a skirt can be disposed about the housing which physically isolates the first chamber from the second chamber. This skirt acts to prevent the inert gas being provided into the first housing from being prematurely withdrawn from the work location by the second chamber which has the negative pressure and serves as an exhaust means. Finally, the unique construction of this generic shield enables accommodation for variations in height and substrate orientation relative to it without jeopardizing the efficiency and effectiveness of a metal processing procedure.

BRIEF DESCRIPTION OF THE DRAWINGS

The above as well as other features and advantages of the present invention can be readily appreciated through consideration of the detail description of the invention in conjunction with the accompanying drawings in which.

DETAILED DESCRIPTION OF THE INVENTION

Figure 1:
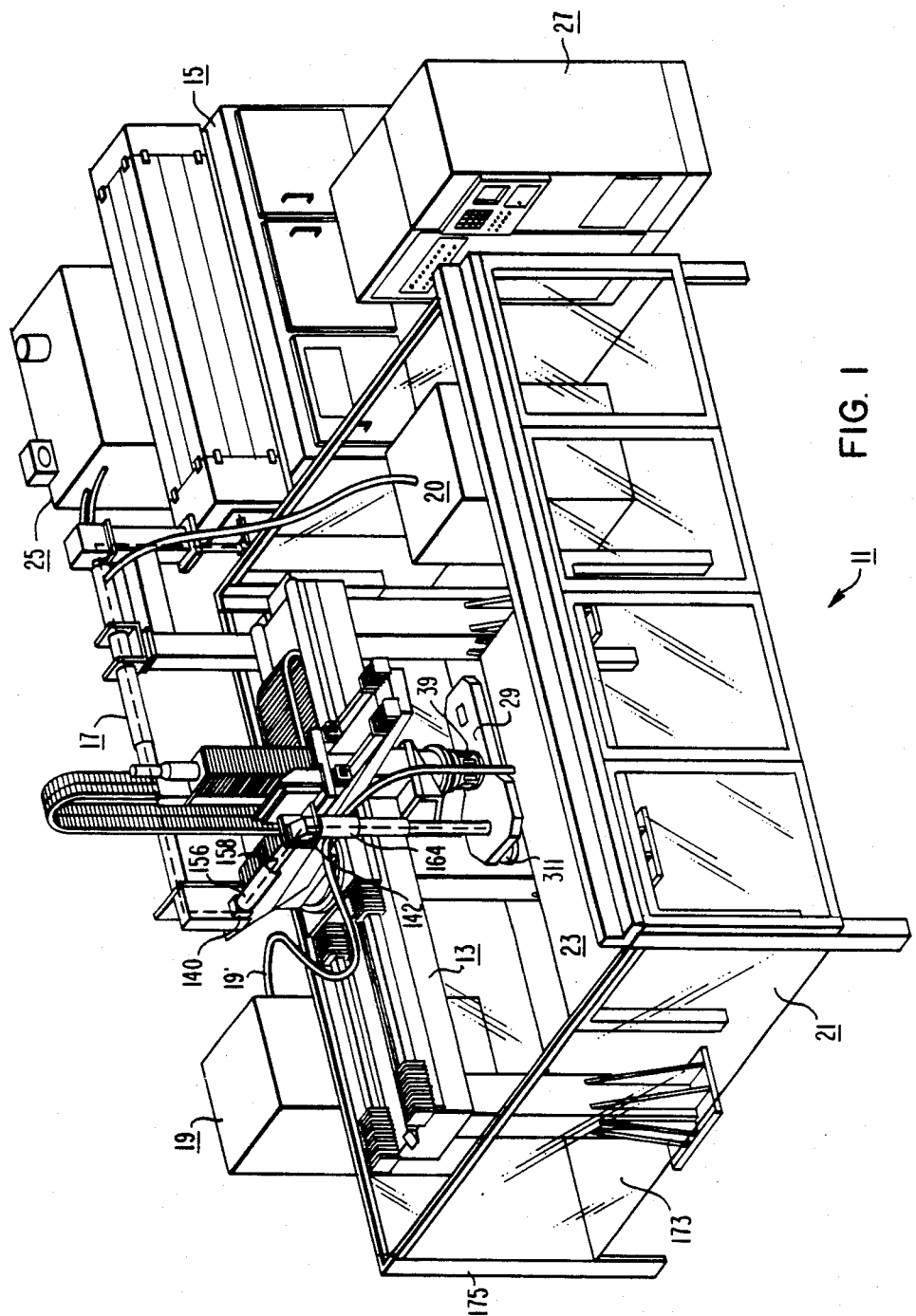
FIG. 1 is an isometric view of an orthogonal axis manipulator system incorporating a laser beam delivery system and the unique generic shielding apparatus of this invention.

This invention provides a generic shield which can be used in welding, surfacing and cladding operations. These operations can be performed with either high power density processes such as lasers and out of vacuum electron beams or arc assisted processes such as GMAW (MIG), or GTAW (TIG) and plasma welding and/or cladding systems. In FIG. 1 the generic shield of this invention is shown in a robotic work cell application in which the metal processing is being affected by a high powered laser. This implementation of the generic shield is for illustrative purposes only and those skilled in the art readily appreciate the fact that this invention can be utilized in conjunction with the other types of processes as indicated above.

A complete integrated robot laser work cell is isometrically presented in FIG. 1 and generally indicated by the reference character 11. The robot laser system 11 includes an orthogonal axis manipulator system 13 to which is coupled a laser system 15 by means of a laser beam delivery system 17. The system 11 also includes an exhaust system 19, a safety enclosure means 21 and a precision table or other fixture as a 23. A coolant chiller for the optics used in the laser beam delivery system as well as in the generic shield is indicated at 25. Programmable controller by which the orthogonal axis manipulator is directed is shown at 27. The manipulator system 13 comprises three orthogonal axis assemblies consisting of the X axis assembly 33, the Y axis assembly 35, and the Z axis assembly 37. A wrist mechanism 39 is mechanically coupled to the Z axis assembly 37 to accommodate the end of arm tooling carousel 29. The end of arm tooling carousel 29 is provided with the optics necessary to affect various metal processing applications which are effected in combination with a laser beam delivery system 17.

The laser beam delivery system used with this robot comprises in its simplest form, a series of joints which are attached to a support member or arm defining one axis of movement of the robotic system 13. Allowed U.S. patent application Ser. No. 460,346, which is entitled "robotic laser beam delivery apparatus" by Daniel J. Plankenhorn, which application is assigned to the assignee of the present invention, and incorporated herein by reference, discloses a light beam directing apparatus which permits a reflected beam of light such as a laser to be directed in a path which comprises a plurality of straight segments. Each segment of the beam is associated with a segment of the robot's axis in a fixed spatial relationship.

The work cell of FIG. 1 is shown to include an Everlast EFA 51 $CO_2$ laser manufactured by Coherent, Inc. However since laser selection is highly application dependent, it should be recognized that any one of a number of lasers can be utilized in this system. Additionally, the work cell shown in FIG. 1 utilizes air filtration drying and recirculating system shown at 20. A suitable system is commercially available in Balstrom Filter products "Air Dryer Model 75". The exhaust system 19 includes a conduit system 19' which terminates proximate the laser beam delivery point 30 of the manipulator 13. It should be appreciated that due to the generic material processing nature of such a system as described herein, some materials will admit toxic fumes during laser processes. Accordingly this exhaust system 19 provides a pick up nozzle disposed proximate the wrist and directed toward the source of the fumes. Means are provided in association with the pick up nozzle to generate the negative pressure necessary to draw the fumes from the work area for ultimate discharge and/or filtration.

The work so illustrated in FIG. 1 also includes a plexiglass enclosure surrounding the working envelope in order to provide a substantial margin of safety. The plexiglass enclosure, due to the characteristics of plexiglass, will serve a multiplicity of purposes. For example, as plexiglass is hit by a 10.6 micron $CO_2$ laser, smoke is emitted prior to burn through and serves as an early warning signal to any individuals proximate the work cell. Additionally, plexiglass allows the operator to view the system operation with the increased risk of harm and serves as a line of defense against unauthorized personnel entering the work envelope. These plexiglass panels are generally indicated by the reference character 173 and are supported by the frame work members 175.

The generic shield apparatus of this invention is shown mounted on a carousel end of arm tooling apparatus 29. Typically the carousel is provided with at least two separate tooling stations. However any number of individual tooling stations can be provided on a carousel with the number being limited only by the practical applications that can be achieved through the use of additional tooling stations. As can be appreciated through viewing of FIGS. 1-3, the generic shield becomes an integral part of the laser beam delivery system and serves to support the optics used in one of the tooling stations.

Figure 2:
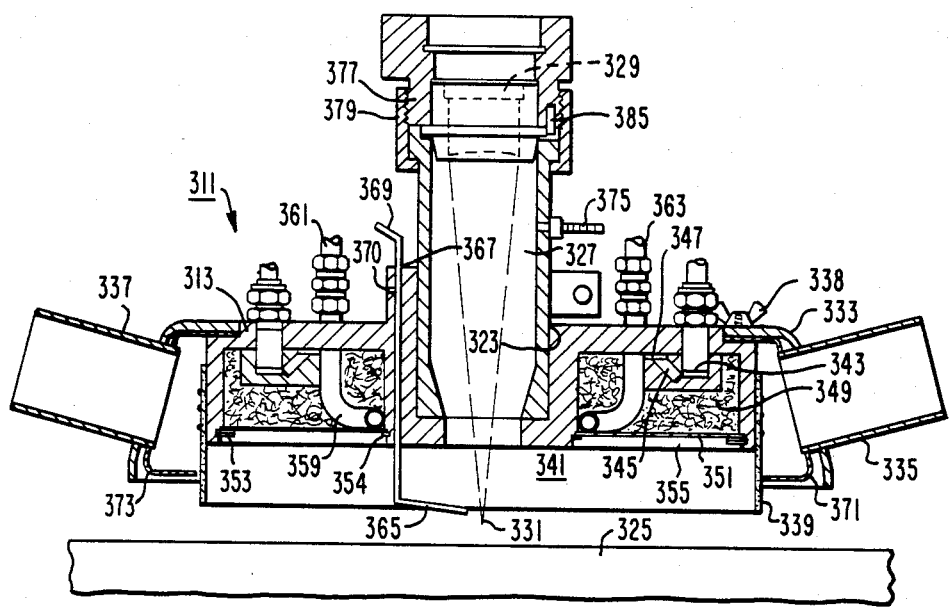
FIG. 2 is an elevational view through the generic shielding apparatus of this invention.
Figure 3:
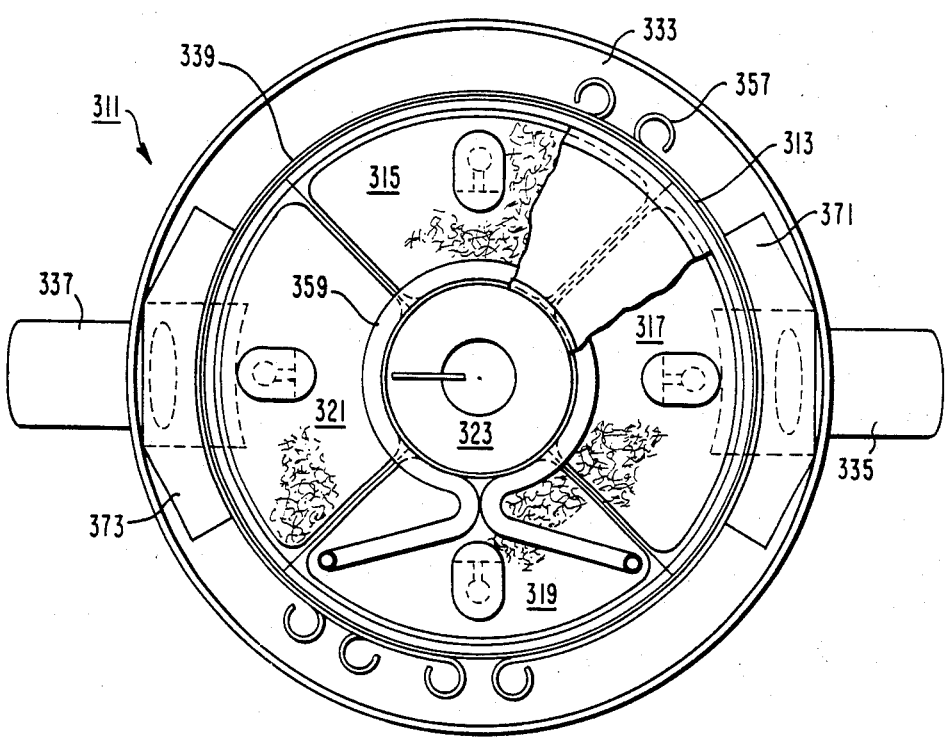
FIG. 3 is a plan view of the generic shielding apparatus of this invention illustrating the individually supplied inert gas chambers of this generic shielding apparatus.

Turning now to FIGS. 2 and 3, the details of the construction of the generic shield of this invention can be readily appreciated. The generic shield of this invention generally indicated by the reference character 311 has a housing 313 which defines the chamber which is preferably subdivided into quadrants as at 315, 317, 319 and 321. The housing 313 has a centrally disposed bore 323 therethrough which defines a conduit for the application of metal processing thermal excitation onto a selected location of a workpiece or substrate as at 325. For illustrative purposes the conduit 323 of the housing has supported therewithin a laser transmitting chamber 327 having therein as at 329 the appropriate lenses to effect the desired focal point of the laser beam 331. A smoke removal hood 333 is circumferentially disposed about the housing 313 and is in communication with exhaust duct means 335 and 337 by which a negative pressure zone is created about the outside edge of the housing 313. The hood 333 is removably secured to the housing 313 by means of three wing nuts 338 spaced 120° apart. A skirt 339 is circumferentially disposed about the housing 313 and acts to isolate the inert gas zone generally indicated by the reference character 341 below the quadrants of the housing 313. The skirt 339 can consist of either a generally rigid member or it can be a more flexible asbestos material. The actual selection of the skirt composition will be more readily appreciated in the discussion of later drawings in which additional capabilities of this device are described.

In order to ensure controlled distribution of the shielding gas, the shield housing 313 comprises four independently controlled gas discharging chambers 315, 317, 319 and 321. This arrangement also imparts to the shield housing the unique capability of accommodating changes in the shield/substrate distance and the relative orientation of the two to each other as will be described below.

The inert gas is introduced into the chamber by means of a nozzle 343 which discharges the gas into a deflector 345. The deflector is designed to discharge the gas onto the ceiling 347 of the individual quadrant. As a result, the stream of gas coming out of the deflector is broken into a less directional flow of gas. The gas is forced to "flood" the chamber more uniformly as it moves toward the gas diffusers 349 which preferably comprises nickel wool. This enhanced "flooding" of the deflected gas helps to prevent the entrapment of air pockets in the chamber and makes the gas flow less turbulent before it reaches the diffusing screens 351. The nickel wool is used as a first stage gas diffuser and functions to break the directionality of the gas flowing through it and reduce its velocity. These actions tend to even out the flooding of the gas in the chamber. A stack of filter screens 351 comprises the shield's gas lens. This bank of gas diffusing screens acts to provide a cross-sectionally uniform flow of gas and a laminar-like flow pattern of the outcoming shielding gas toward the substrate 325. The principal behind this arrangement is the uniform pressure-gradient created across these screens 351, that is the pressure in the chamber and the atmospheric pressure on the other side of the screen bank. It is preferred that three to five 200 mesh filter screens stacked on top of one another define the stack of filter screens 351. The screens can be made of stainless steel, copper, brass or the like. The diffuser screens 351 are designed to be replaced periodically. Occasional melting by secondary and/or stray laser beams or arcing, spatter and smoke accumulation may lead to eventual degradation of their functionality due to excessive pore clogging. These screens can be held onto the shield by external and internal spin-olox rings as at 353 and 354. Additionally to support the nickel wool a perforated filter plate 355 can be mounted above the screens. (The nickel wool can be made of copper, brass, stainless steel, aluminum, etc.) The nickel wool support plate can be secured to the shield by flat-headed screws which are threaded into stainless steel sockets. These sockets are forcibly inserted into the shield's structure and not illustrated herein.

The skirt 339 disposed about the shielding area 341 can be held in place by means of wire clamps 357. Alternatively a large diameter hose clamp could be utilized. Additionally, in order to augment the frictional fit between the skirt and the shield's body and to prevent displacement of the wire clamp 357, grooves can be machined into the shield's body where the clamps should press the skirt against it. It is preferred that the housing 313 of the shield 311 be constructed of a material characterized by high thermal conductivity such as aluminum. Additionally, heat dissipation from the shield is facilitated by the incorporation of a water cooling loop 359. An inlet 361 and an outlet 363 are provided at the upper portion of the housing body. The tube comprising the loop 359 is made of aluminum which can be brazed, soldered, welded or aluminum plasma sprayed to the shield. The combination of the water cooling loop as well as the use of the aluminum in the construction of the shield tend to minimize localized accumulation of heat in the shield as well as the adverse effects of inertia due to the lightweight construction.

The shield 311 has been shown in combination with a laser conduit 327. When a laser is being used a preferred feature of this invention is a plasma suppression nozzle 365 which is disposed adjacent the exit point of the laser. The nozzle 365 provides a high velocity off-axis jet of inert gas to forcibly blow away the superheated vapors in gases from the welding region. These vapors, called plasma, should be removed because they tend to optically "decouple" the laser beam from the substrate material that is being welded. The housing 313 is provided with a bore 367 through which a conduit 369 is disposed. This conduit defines the nozzle 365. The position of the nozzle 365 is adjusted relative to the plasma by means of the set screw 370.

The exhaust ducts or smoke venting ports 335 and 337 which are in association with the exhaust hood 333 can remove smoke from the hooded area. This can be accomplished through either a vacuum cleaner or a centralized dust removing duct. The smoke removing suction rate is preferably adjusted as dictated by the application i.e., the flow rates of inert gas through the shield, the skirt's end to substrate distance and acceptable shielding levels. Baffles as at 371 and 373 are placed between the smoke removing hood 333 and the shield body or skirt area 339 and are designed to prevent the concentrated suction of the shielding gas from the regions adjoining the smoke venting ducts 335 and 337. The baffles 371 and 373 tend to disrupt the suction about these venting ports and also distribute the suction action more uniformly about the shield.

Additionally, a hose fitting 375 can be provided into the conduit 327 for the purpose of inletting inert gas into the laser transmitting chamber. This gas which flows through the chamber and out through its open end proximate the suppression nozzle 365 is to protect the laser lens from smoke. The prevention of smoke introduction acts to prolong the life of the lens and provide a more consistently reliable performance with the laser. The chamber 327 includes a dowel pin 385 which prevents the rotation of the lens holder upon tightening of its upper end against the lens heat sink 377 by means of threaded member 379. In order to vary the lens to substrate and/or shield to substrate distance, the shield can be made to slide along the lens holder by loosening nut 381 and then locking it into a desired position.

Figure 4:
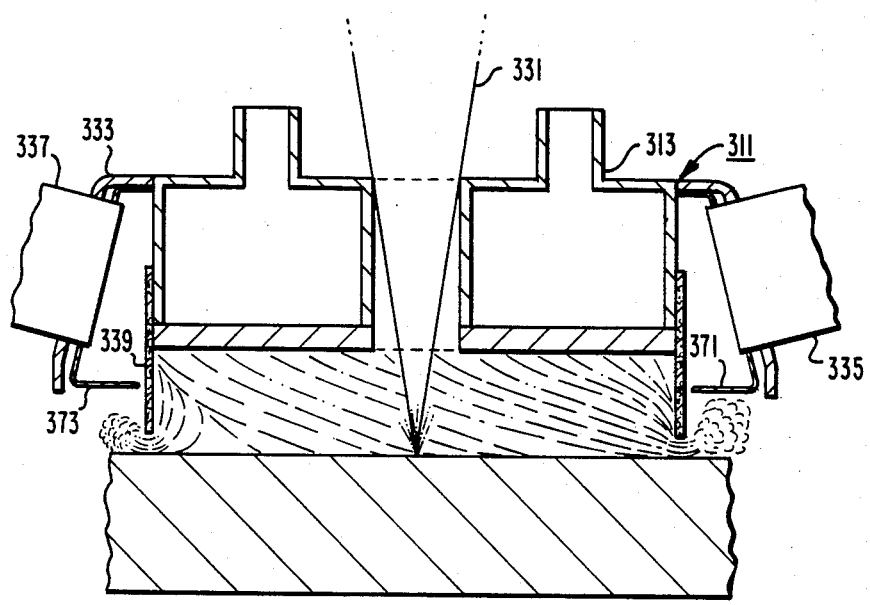
FIG. 4 is a schematic representation of the generic shielding apparatus of this invention with the bypass-flow condition of the inert gases about the focal point of the metal processing application.

FIG. 4 schematically represents the use of this shield to establish a bypass-flow condition about the laser heated region. As discussed above, the housing is preferably divided into quadrants. To insure controlled distribution of the shielding gas, the shield comprises four independently controlled gas discharging chambers or quadrants. This arrangement also imparts to the shield the unique capability of accommodating changes in the shield-substrate distance and the relative orientation of the two to each other. Additionally, the flow direction of the inert gas can be directed as shown in FIG. 4. These unique capabilities are effected by regulating the flow rate of the gas through each chamber. This feature of the shield can be used to direct the smoke generated under the shield in a manner that provides optical viewing of the heated region and/or areas next to be subjected to the heat source. Thus, in order to have a gas flow direction from left to right as viewed at FIG. 4, the flow rate of the inert gas into chamber 1 is greater than the flow rate of gas into chamber 2. Conversely, if a flow direction from right to left were desired, the flow rates described above would be reversed.

Figure 5A:
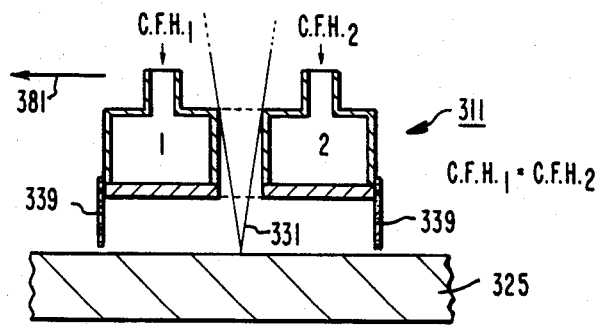
FIGS. 5A, 5B and 5C are schematical representations of the generic shielding apparatus' ability to accommodate changes in the relative distance and orientation of the shielding apparatus with respect to the substrate or workpiece.
Figure 5B:
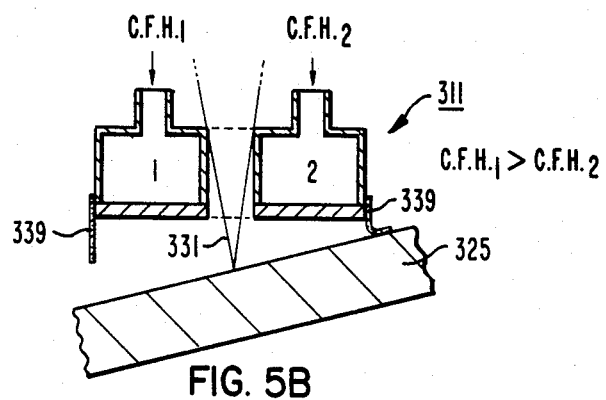
Figure 5C:
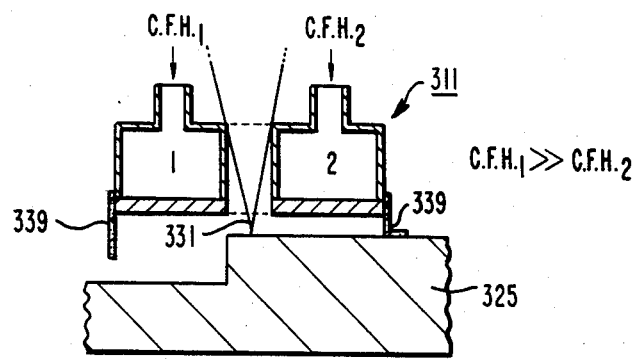

FIGS. 5A, 5B and 5C schematically represent the shield's ability to accommodate changes in the relative distance and orientation of the shield with respect to the substrate or workpiece. In FIG. 5A, the direction of travel of the shield with respect to the workpiece is indicated by the arrow 381. In 5A, the shield is at a fixed distance from the substrate and substantially parallel thereto. In this case the flow rate of the inert gas in chambers 1 and 2 would be substantially equal. The exception of course would be when a bypass flow condition is desired as shown in FIG. 4. In FIG. 5B, the substrate is closer to chamber 2 than to chamber 1. As a result in order to maintain a relatively constant environment between the generic shield and the substrate, the gas flow rate through chamber 1 would be greater than through chamber 2. Additionally, the use of a flexible skirt 339 is shown in FIG. 5B. Finally, FIG. 5C illustrates the use of the generic shield 311 on a substrate having an irregular surface. Again the skirt 339 tends to deflect to accomomdate the irregular work surface. The gas flow rate through chamber 1 would be substantially greater than the gas flow rate through chamber 2 in order to accommodate the irregular volumetric areas defined between the inert chamber 1 and the substrate portion disposed therebelow and the inert gas chamber 2 and the substrate area therebelow. As can be seen, the shield 311 tends to physically isolate the shielding region from the surrounding environment by putting a skirt around it. Through this technique, the shield is functionally made to resemble a chamber moving over a substrate.

What has been disclosed is a generic shield which is usable with most high power density i.e. laser and arc assisted welding processes. The shield can be ued for a variety of applications such as welding, surfacing and cladding. Due to its superior shielding capabilities, this shield can be used to join and heat treat materials that presently require the employment of costly inert gas chambers. This device is relatively compact and due to its superior shielding capabilities it is anticipated that significantly lower flow rates of inert gas will be required, thus resulting in substantial savings in metal processing applications. The unique configuration of this shield allows it to accommodate variations in height and substrate orientation relative to it. As described above, this shield is compatible with industrial manipulators and is a highly desirable tool for use in automated systems. Finally, the superior shielding capabilities of this device make it useful in joining refractory metals such as titanium, zirconium and tantalum.

What is claimed is:

1. A shielding apparatus for metal processing operations comprising:
    a housing having an enclosed upper region with a central bore therethrough which bore defines a conduct for the application of metal processing thermal excitation onto a selected location of a workpiece;
    said housing defining at least a first chamber about said central bore, through which inert gas is introduced to flood an area defined by said first chamber surrounding the selected location of the workpiece for metal processing;
    a second exhaust chamber diposed about a perimeter defined by said first chamber and defining a negative pressure region for the removal of smoke or the like resulting from the metal processing operation;
    a skirt comprising a flexible material disposed about the perimeter defined by said first chamber, said skirt physically isolating said first chamber in which inert gas is introduced from the second exhaust chamber and depending from the perimeter defined by said first chamber so as to cooperate with the workpiece directly below said housing first chamber to substantially enclose the selected location for metal processing;
    a cooling means disposed in said first chamber about said central bore; and
    a plasma suppression nozzle disposed proximate said central bore to provide a high velocity off-axis jet of inert gas to forcibly blow away superheated vapors and gas from the selected location.

2. The shielding apparatus for metal processing operations according to claim 1 wherein the housing defining at least a first chamber through which inert gas is introduced has four chambers into which controlled inert gas streams are introduced.

3. The shielding apparatus for metal processing operations according to claim 2 wherein each chamber into which controlled inert gas streams are introduced includes filter screen means which at least in part support a metallic wool material whereby a controlled distribution of the shielding gas is effected.

4. The shielding apparatus for metal processing operations according to claim 3 wherein the screen means comprise three to five 200 mesh filter screens stacked one on top of another.

5. The shielding apparatus for metal processing operations according to claim 4 wherein the metallic wool material is selected from the group comprising nickel wool, copper, brass, stainless steel and aluminum.

6. The shielding apparatus for metal processing operations according to claim 4 wherein the inert gas which is introduced to flood an area surrounding the selected location is injected into said chamber by a nozzle means which directs the flow of inert gas toward the enclosed upper region of the housing, wherein said inert gas is diffused within said chamber.

7. The shielding apparatus for metal processing operations according to claim 1 including nozzle means in communication with said at least first chamber by which inert gas in introduced thereinto and including means for controlling the flow of gas into said at least first chamber whereby the direction of gas flow about the selected location can be controlled.

8. A shielding apparatus for metal processing operations comprising:
    a housing having an enclosed upper region with a central bore therethrough which bore defines a conduit for the application of metal processing thermal excitation onto a selected location of a workpiece;
    said housing defining at least a first chamber about said central bore, through which inert gas is introduced to flood an area defined by said first chamber surrounding the selected location of the workpiece for metal processing;
    a second exhaust chamber disposed about a perimeter defined by said first chamber and defining a negative pressure region for the removal of smoke or the like resulting from the metal processing operation;
    a skirt comprising a flexible material disposed about the perimeter defined by said first chamber, said skirt physically isolating said first chamber in which inert gas is introduced from the second exhaust chamber and depending from the perimeter defined by said first chamber so as to cooperate with the workpiece directly below said housing first chamber to substantially enclose the selected location for metal processing;
    a cooling means disposed in said first chamber about said central bore.

9. The shielding apparatus for metal processing operations according to claim 8 wherein the housing defining at least a first chamber through which inert gas is introduced has four chambers into which controlled inert gas streams are introduced.

10. The shielding apparatus for metal processing operations according to claim 8 wherein each chamber into which controlled inert gas streams are introduced includes filter screen means which at least in part support a metallic wool material whereby a controlled distribution of the shielding gas is effected.

11. The shielding apparatus for metal processing operations according to claim 10 wherein the screen means comprise three to five 200 mesh filter screens stacked one on top of another.

12. The shielding apparatus for metal processing operations according to claim 11 wherein the metallic wool material is selected from the group comprising nickel wool, copper, brass, stainless steel and aluminum.

13. The shielding apparatus for metal processing operations according to claim 11 wherein the inert gas which is introduced to flood an area surrounding the selected location is injected into said chamber by a nozzle means which directs the flow in inert gas toward the enclosed upper region of the housing, wherein said inert gas is diffused within said chamber.

14. The shielding apparatus for metal processing operations according to claim 8 including nozzle means in communication with said at least first chamber by which inert gas is introduced thereinto and including means for controlling the flow of gas into said at least first chamber whereby the direction of gas flow about the selected location can be controlled.

15. The shielding apparatus for metal processing operations according to claim 8 including nozzle means in communication with said at least first chamber by which inert gas is introduced thereinto and including means for controlling the flow of gas into said at least first chamber whereby the direction of gas flow about the selected location can be controlled.

16. The shielding apparatus for metal processing operations according to claim 8 including a plasma suppression nozzle disposed proximate the central bore to provide a high velocity off axis jet of inert gas to forcibly blow away any superheated vapors and gas from the selected location.

17. In combination with an integrated robot laser comprising: a robotic system having one or more mechanical joints defining at least in part a fixed axis of motion and a second axis of motion, which axes of motion define a contoured path through the robotic system's geometric range of motion, wherein each of said mechanical joints defines in part a frame member; and a wrist assembly adapted to mountably receive thereon an end effector or the like to impart at least rotational movement thereto; and an integrated laser beam delivery system for the delivery of a beam along any point within said geometric range of motion to a terminal location proximate said wrist assembly, said integral laser beam delivery system including a plurality of optical joints and tubular members disposed between adjacent optical joints and through which tubular members the beam passes as it travels from optical joint to optical joint; a carousel tooling apparatus comprising a base member adapted to be mounted onto said wrist assembly such that rotational movement is imparted to said carousel tooling apparatus, said base member having a first tooling station thereon and at least a second tooling station thereon wherein the rotational movement of said base member as effected by said wrist assembly, selectively presents each of said tooling stations to said terminal location of said laser beam delivery system;
a shielding apparatus for metal processing operations for use in combination with one of said tooling stations, said shielding apparatus comprising:
a housing having an enclosed upper region with a central bore therethrough which bore defines a conduit for the application of metal processing thermal excitation onto a selected location of a workpiece;
said housing defining four chambers about said central bore through each of which inert gas is selectively introduced to flood an area defined by said four chambers surrounding the selected location of the workpiece for metal processing;
a second exhaust chamber means disposed about a perimeter defined by said four chambers and defining a negative pressure region for the removal of smoke or the like resulting from the metal processing operation;
a skirt disposed about a perimeter defined by said four chambers, said skirt physically isolating said second chamber means from said four chambers; and
a cooling means disposed in said first chamber about said central bore.

18. The combination according to claim 17 including a plasma suppression nozzle means disposed proximate the central bore to provide a high velocity off-axis jet of inert gas to forcibly blow away superheated vapors and gas from the selected location, said nozzle means being positionally adjustable relative to the central bore.

19. The shielding apparatus for metal processing operations according to claim 18 wherein each chamber into which controlled inert gas streams are introduced includes filter screen means which at least in part support a metallic wool material whereby a controlled distribution of the shielding gas is effected.

20. A shielding apparatus for metal processing operations comprising:
a housing having an enclosed upper region with a central bore therethrough which bore defines a conduit for the application of metal processing thermal excitation onto a selected location of a workpiece, said housing defining four separate chambers disposed about the central bore and through which separate chambers controlled inert gas streams are introduced, each separate chamber including nozzle means which directs the flow of inert gas toward the enclosed upper region of the housing, wherein said inert gas is diffused within each separate chamber, said chambers further including filter screen means which at least in part support a metallic wool material whereby a controlled distribution of the shielding gas is effected;
a second chamber disposed about a perimeter defined by said housing and defining a negative pressure region for the removal of smoke or the like resulting from the metal processing operation;
a skirt comprising a flexible material disposed about a perimeter defined by the separate chambers, said skirt physically isolating said chambers in which inert gas is introduced from the exhaust chamber and depending from the parameter defined by said chambers so as to cooperate with the workpiece directly below said housing chambers in order to substantially enclose the selected location for metal processing;
a cooling means disposed in said first chamber about said central bore; and
a plasma suppression nozzle disposed proximate said central bore to provide a high velocity off-axis jet of inert gas to forcibly blow away superheated vapors and gas from the selected location.

* * * * *